United States Patent
Sankaranarayanan et al.

(10) Patent No.: US 11,604,732 B1
(45) Date of Patent: Mar. 14, 2023

(54) MEMORY PERFORMANCE DURING PROGRAM SUSPEND PROTOCOL

(71) Applicant: Micron Technology, Inc., Boise, ID (US)

(72) Inventors: Sundararajan N. Sankaranarayanan, Fremont, CA (US); Eric Lee, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/465,033

(22) Filed: Sep. 2, 2021

(51) Int. Cl.
*G06F 12/0815* (2016.01)
*G06F 3/06* (2006.01)
*G06F 12/02* (2006.01)

(52) U.S. Cl.
CPC ........ *G06F 12/0815* (2013.01); *G06F 3/0611* (2013.01); *G06F 3/0659* (2013.01); *G06F 3/0679* (2013.01); *G06F 12/0246* (2013.01); *G06F 2212/1024* (2013.01)

(58) Field of Classification Search
None
See application file for complete search history.

(56) References Cited

U.S. PATENT DOCUMENTS

| | | | | |
|---|---|---|---|---|
| 5,822,244 A | * | 10/1998 | Hansen | G11C 16/10 365/185.11 |
| 8,850,103 B2 | * | 9/2014 | Bennett | G11C 16/32 711/151 |
| 11,348,648 B2 | * | 5/2022 | Harada | G11C 16/10 |
| 2011/0208905 A1 | * | 8/2011 | Shaeffer | G11C 16/10 711/E12.008 |
| 2019/0354498 A1 | * | 11/2019 | Ebsen | G06F 13/1626 |
| 2020/0285416 A1 | * | 9/2020 | Wu | G06F 3/061 |

* cited by examiner

*Primary Examiner* — Kaushikkumar M Patel
(74) *Attorney, Agent, or Firm* — Lowenstein Sandler LLP

(57) ABSTRACT

Systems and methods are disclosed including a processing device operatively coupled to memory device. The processing device perform operations comprising receiving a sequence of read commands from a memory sub-system controller; retrieving first data by executing a first read command of the set of read commands; storing the first data in a first portion of a cache of the memory device; responsive to determining that the memory device is in a suspended state, determining whether a first address range specified by the first read command overlaps with a second address range specified by a second read command of the set of read commands; responsive to determining that the first address range does not overlap with the second address range, retrieving second data by executing the second read command and storing the second data in a second portion of the cache; transferring the first and second data to the controller.

20 Claims, 6 Drawing Sheets

MEMORY PERFORMANCE DURING PROGRAM SUSPEND PROTOCOL

TECHNICAL FIELD

Embodiments of the disclosure generally relate to memory sub-systems, and more specifically, relate to improved memory performance during program suspend protocol.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
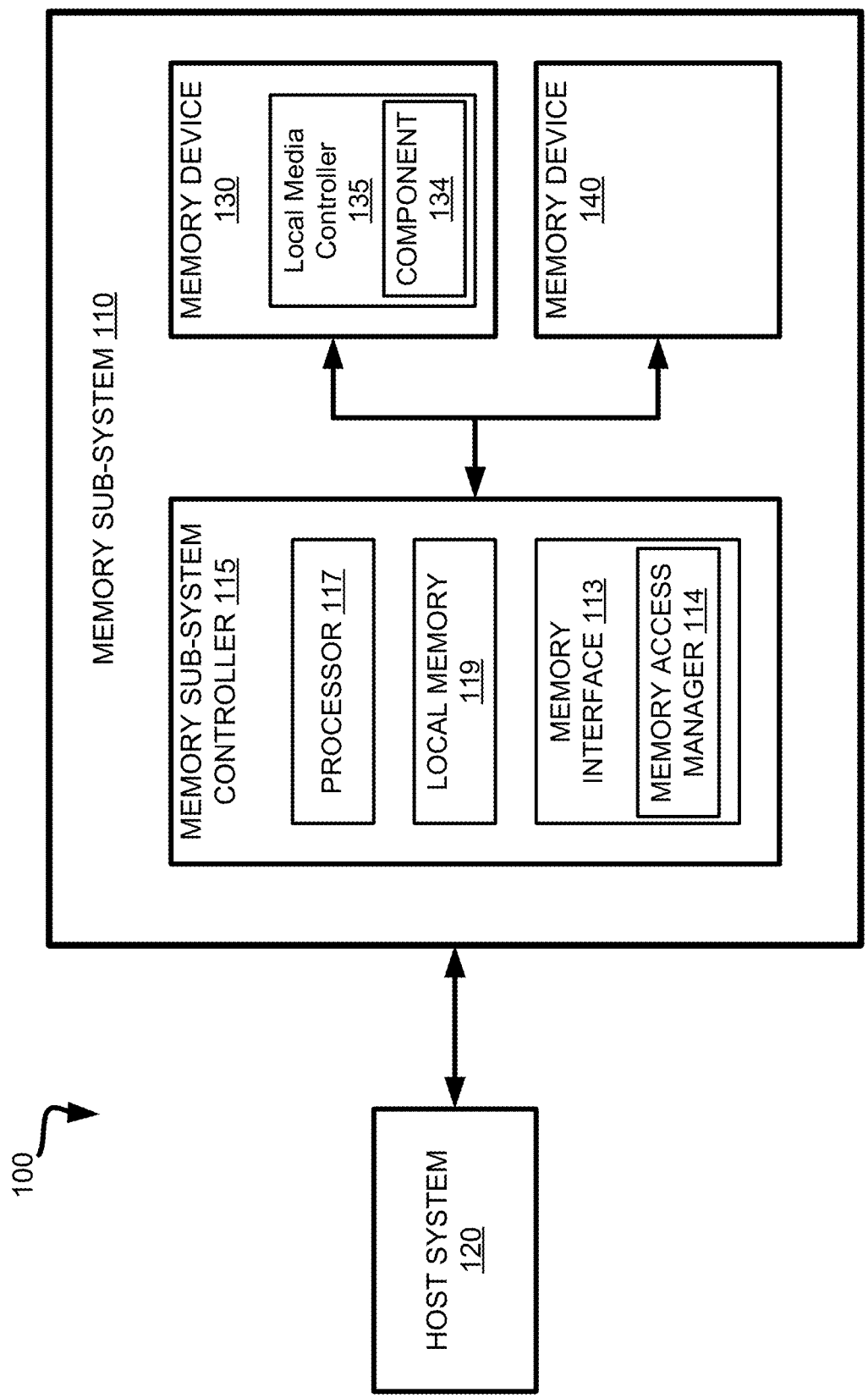
FIG. 1 illustrates an example computing system that includes a memory sub-system in accordance with some embodiments of the present disclosure.

Aspects of the present disclosure are directed to improved memory performance during program suspend protocol. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. A non-volatile memory device is a package of one or more dies. Each die can consist of one or more planes. For some types of non-volatile memory devices (e.g., NAND devices), each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can include multiple memory cells arranged in a two-dimensional grid. Memory cells are etched onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form a plane of the memory device in order to allow concurrent operations to take place on each plane. The memory device can include circuitry that performs concurrent memory page accesses of two or more memory planes. For example, the memory device can include a respective access line driver circuit and power circuit for each plane of the memory device to facilitate concurrent access of pages of two or more memory planes, including different page types. For ease of description, these circuits can be generally referred to as independent plane driver circuits. Depending on the storage architecture employed, data can be stored across the memory planes (i.e. in stripes). Accordingly, one request to read a segment of data (e.g., corresponding to one or more data addresses), can result in read operations performed on two or more of the memory planes of the memory device.

A page cache (or buffer) is a circuit block comprising a number of memory elements and additional circuitry. Each page cache can be coupled to a bitline and used to latch data sensed from the memory array during a read operation, and to store data to be programmed into the memory array (e.g., the page cache stores data read from the memory array, or host data to be written to the memory array). The page cache includes static memory elements, such as a primary data cache (PDC) and a secondary data cache (SDC). The PDC holds data that is used to keep the bit line at a voltage level sufficient to shift a threshold voltage of a memory cell during programming, or to sense the data from a bit line during a read operation. The SDC is a memory element accessible to the host system and is used as a data read/write buffer. The PDC and SDC are independent from one another. The page cache can further include a sense amplifier to read data from memory cells, and dynamic memory elements. The memory sub-system controller can move data in the PDC to the SDC to allow it to be read by the host system, or to any of the dynamic memory elements for use in logical operations.

Memory access operations can be performed by the memory sub-system. The memory access operations can be host-initiated operations or memory sub-system controller initialed. For example, the host system can initiate a memory access operation (e.g., write operation, read operation, erase operation, etc.) on a memory sub-system. The host system can send memory access commands (e.g., write command, read command) to the memory sub-system, such as to store data on a memory device at the memory sub-system and to read data from the memory device on the memory sub-system. The data to be read or written, as specified by a host request, is hereinafter referred to as "host data". A host request can include logical address information (e.g., logical block address (LBA), namespace) for the host data, which is the location the host system associates with the host data. The logical address information (e.g., LBA, namespace) can be part of metadata for the host data. Metadata can also include error handling data (e.g., ECC codeword, parity code), data version (e.g. used to distinguish age of data written), valid bitmap (which LBAs or logical transfer units contain valid data), etc. Memory access operations initiated by the memory sub-system controller can relate to maintenance operations, such as garbage collection, wear leveling, bad block management, block refresh operations, etc.

A memory sub-system can receive a request to perform a memory access operation, such as a write operation to program data supplied by the host, and then, before the program operation has been completed, receive a request to perform another memory access operation, such as a read operation on the same address. The memory sub-system can keep the data being programmed in the controller memory (e.g., dynamic random-access memory (DRAM)) while the memory device (e.g., negative-and (NAND) type flash memory) of the memory sub-system is being programmed, and then flush the controller memory when the program operation is complete. As long as the programming time (i.e., the time for performing the program operation of the memory device) is relatively short, the controller memory of reasonable size can accommodate the data to be programmed. If, however, the memory device uses certain types of memory cells, such as triple level cells (TLCs) or quad-level cells (QLCs), the programming times can increase significantly. As such, the command processing latency associated with the subsequently received memory access operations is increased significantly. If a subsequent request to perform a read operation is received while the program operation is still ongoing, some memory sub-systems would wait until the program operation is complete before performing the read operation on the memory device. This can lead to significant latency in responding to requests from the host system.

In order to reduce latency in mixed workloads (e.g., a combination of write operations and read operations, such as a read operation followed immediately by a write operation), certain memory sub-systems utilize a program suspend protocol to allow subsequently received memory access commands (e.g., read command) to access the memory device on which a write operation is currently being performed. The program suspend protocol can temporarily pause the write operation to allow access to the memory array. In particular, when the memory sub-system receives a request to perform a memory access operation on the data stored in a certain page of the memory device while a write operation is in progress, the memory sub-system controller can issue a program suspend command, which causes the memory device to enter a suspended state.

In some memory sub-systems, the suspend protocols can require the memory device to fully process one read command prior to the memory sub-system processing the subsequent read command. For example, while in the suspended state, the memory device can receive a read command, retrieve the requested data from the memory array into the page cache (e.g., the SDC), and transfer the retrieved host data from the page cache to the memory sub-system controller. Once the data has been transferred, the memory device can process the subsequent read command. However, this process can increase the latency in responding to multiple read commands from the host system when the memory device is in the suspended state, and thus can negatively impact the quality of service provided by the memory sub-system. For example, although the page cache can have memory space to store data from multiple read commands (e.g., a page cache can include 16 kilobyte (KiB) page, whereas a read command can request 4 or 8 KiBs of data), the memory device needs to wait until each read command is fully processed until any subsequent read commands can be initialized.

Aspects of the present disclosure address the above and other deficiencies by implementing a memory device capable of storing, in a page cache, data from multiple read commands while the memory device is in the suspended state. In particular, the memory device receives a sequence of read commands from a memory sub-system controller. The read commands can request host data residing on the memory device. The memory device, via a memory access component of the memory device, can initiate an initial read command from the set of read commands. In particular, using the physical address range corresponding to the logical address range specified by the initial read command, the memory access component can retrieve the data from the memory array of the memory device. The memory access component can then cache the data in a portion of the page cache of the memory device. For example, data from a four KiB read command can be stored in the first four KiB portion of a 16 KiB page cache. Prior to transferring (to the memory sub-system controller) the data cached in the page cache, the memory access component can determine whether the memory device is in the suspended state. In some embodiments, the memory access component can check whether the memory sub-system controller issued a suspend program command without issuing a subsequent resume program operation. In some embodiments, the memory access component can maintain, in a data structure, an indicator (e.g., a bit flag) indicative of the suspended state of the memory device. If the memory device is not in the suspended state, the memory access component can transfer the cached data to the memory sub-system controller and initiate the next read command of the set.

If the memory device is in the suspended state, the memory access component can check whether the address range corresponding to the initial read command overlaps with the address range of the next read command of the sequence. A read command overlaps with another read command if at the address range of one read command overlaps with the address range of the other read command. If the address ranges overlap, the memory access component can transfer, to the memory sub-system controller, the cached data and initiate the next read command of the set. When the address ranges do not overlap, the memory access component can initial the next read command by retrieving the corresponding data from the memory array of the memory device. The memory access component can then cache the data in another portion of the page cache of the memory device. For example, an eight KiB read command can be stored in the second four KiB portion of the 16 KiB page cache. Thus, data is cached in the first 12 KiBs of space of the 16 KiB page cache. The memory access component can retrieve data from additional non-overlapping read commands of the sequence until the page cache is full or does not have enough memory space to cache data from any additional non-overlapping read commands. At such time, the memory device can transfer, from the page cache to the memory sub-system controller, all of the data in a single transfer operation.

Advantages of the present disclosure include, but are not limited to, an improved performance of the memory device and an improved quality of service for the host system by caching the data from multiple memory access commands in a page cache of a memory device and transferring the data by a single transfer operation. This allows the memory device to process multiple memory access commands without the latency produced by immediately transferring data from each memory access command. Outside of the suspend state, where there may be enough latches to store data from multiple read access commands, embodiments of the present disclosure enable sharing a single cache to store data from multiple reads. By reading data from two or more read commands into SDC, the memory device avoids having to transfer data from PDC to SDC. In memory sub-systems where there is a lack of latch resources to store data from multiple read access commands while the memory device is in the suspended state (available latches can be used to store data of the suspended write operation), the present disclosure enables the memory device to store read data from multiple read access commands. Furthermore, in scenarios where the memory sub-system controller is busy performing operations on other dies and cannot readily transfer out data, reading data into the same latch prevents a die from going idle. Thus, embodiments of the present disclosure reduce the amount of time a memory device can process multiple memory access commands, which reduces latency and improves performance of the memory device.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point array of non-volatile memory cells and NAND type flash memory (e.g. 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processing device, which includes one or more processors (e.g., processor 117), configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical MU address, physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which includes a raw memory device 130 having control logic (e.g., local controller 132) on the die and a controller (e.g., memory sub-system controller 115) for media management within the same memory device package. An example of a managed memory device is a managed NAND (MNAND) device.

The memory sub-system 110 includes a memory interface component 113, which includes memory access manager 114. Memory interface component 113 is responsible for handling interactions of memory sub-system controller 115 with the memory devices of memory sub-system 110, such as memory device 130. For example, memory interface component 113 can send memory access commands corresponding to requests received from host system 120 to memory device 130, such as write (program) commands, read commands, erase commands, or other commands. In addition, memory interface component 113 can receive data from memory device 130, such as data retrieved in response to a read command or a confirmation that a write (program) command was successfully performed. In some embodiments, the memory sub-system controller 115 includes at least a portion of the memory access manager 114. For example, the memory sub-system controller 115 can include a processor 117 (processing device) configured to execute instructions stored in local memory 119 for performing the operations described herein. In some embodiments, the memory interface component 113 is part of the host system 120, an application, or an operating system. In one embodiment, memory interface component 113 includes memory access manager 114, among other sub-components. Memory access manager 114 can direct specific commands, including suspend and resume commands, to memory device 130 to manage collisions between different memory access operations. A collision can occur when a pending memory access operation is being performed on cells of a certain data block, sub-block, and wordline of memory device 130 when a request to perform a subsequent memory access operation on cells of the same data block, sub-block and wordline is received. In response to such a collision, memory access manager 114 can determine how to proceed. In some embodiment, memory access manager 114 can suspend the pending memory access operation by issuing a designated suspend command to memory device 130 and then issuing a request to perform a subsequent memory access operation while the pending memory access operation is suspended.

In some embodiments, while a pending memory access operation is being performed on cells of a certain data block, sub-block, and wordline of memory device 130, memory interface 113 can receive additional memory access commands to perform multiple additional memory access operations on cells of the same data block, sub-block and wordline. In such a case, the memory access manager 114 can first determine whether the address range of one of the additional memory access commands overlaps with the address range of another of the additional memory access commands. In response to determining that the address ranges of at least two additional memory access commands overlap, memory access manager 114 can present the additional memory access commands to the memory device 130 one at a time. For example, the memory access manager 114 can present the first additional memory access command to memory device 130, receive the host data associated with the first additional memory access command, then present the second additional memory access command to memory device 130, receive the host data associated with the second additional memory access command, and so forth. By issuing the additional memory access commands one at a time, memory access manager 114 prevents read overwrites from occurring in the page cache. In response to determining that the address ranges of the additional memory access commands do not overlap (referred to as "non-overlapping memory access commands" herewith), memory access manager 114 can present the additional memory access commands to the memory device 130 collectively. The memory device 130 can retrieve and store, into the page cache of the memory device 130, the host data associated with the additional memory access commands, and send the host data to the memory interface 113 in a single transfer operation (e.g., clock out). Further details with regards to the operations of memory access manager 114 are described below.

In some embodiments, memory device 130 includes a memory access component 134 configured to carry out corresponding memory access operations, in response to receiving the memory access commands from memory access manager 114. In some embodiments, local media controller 135 includes at least a portion of memory access component 134 and is configured to perform the functionality described herein. In some embodiments, memory access component 134 is implemented on memory device 130 using firmware, hardware components, or a combination of the above. In some embodiments, memory access component 134 receives, from a requestor, such as memory access manager 114, a request to suspend performance of an ongoing memory access operation having a long operation time (e.g., a TLC program operation). In response, the memory access component 134 can cause memory device 130 to enter the suspended state, where the pending memory access operation is suspended during the suspended state. Memory access component 134 can further receive one or more requests to perform additional memory access operations, such as a multiple read operations, while the memory device 130 is in the suspended state. Memory access component 134 can initiate the multiple additional memory access operations, can notify memory access manager 114 when the additional memory access operations are complete, and the memory access manager 114 can send a request to resume the suspended memory access operation. Further details with regards to the operations of memory access component 134 are described below.

Figure 2:
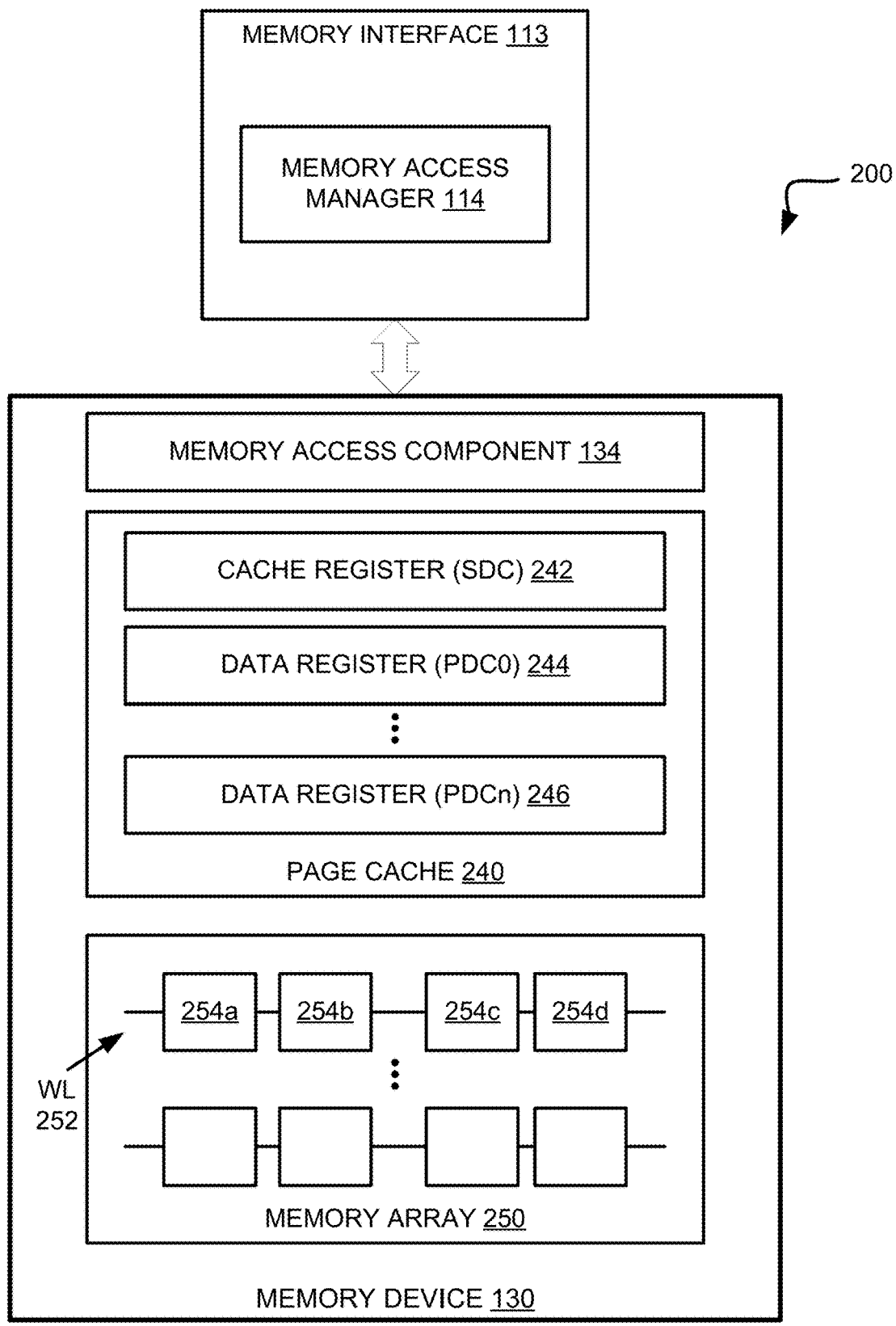
FIG. 2 is block diagram illustrating a memory sub-system implementing multiple read operations during program suspend protocol, accordance with some embodiments of the present disclosure.

FIG. 2 is a block diagram 200 illustrating a memory sub-system implementing multiple memory access operations during program suspend protocol, in accordance with some embodiments of the present disclosure. In one embodiment, memory interface 113 is operatively coupled with memory device 130. In one embodiment, memory device 130 includes a page cache 240 and a memory array 250. Memory array 250 can include an array of memory cells formed at the intersections of wordlines, such as wordline 252, and bitlines (not shown). In one embodiment, the memory cells are grouped in to blocks, which can be further divided into sub-blocks, where a given wordline, such as wordline 252, is shared across a number of sub-blocks 254a, 254b, 254c, 254d, for example. In one embodiment, each sub-block corresponds to a separate plane in the memory array 250. The group of memory cells associated with a wordline within a sub-block is referred to as a physical page. Each physical page in one of the sub-blocks can include multiple page types. For example, a physical page formed from single level cells (SLCs) has a single page type referred to as a lower logical page (LP). Multi-level cell (MLC) physical page types can include LPs and upper logical pages (UPs), TLC physical page types are LPs, UPs, and extra logical pages (XPs), and QLC physical page types are LPs, UPs, XPs and top logical pages (TPs). For example, a physical page formed from memory cells of the QLC memory type can have a total of four logical pages, where each logical page can store data distinct from the data stored in the other logical pages associated with that physical page.

Depending on the programming scheme used, each logical page of a memory cell can be programmed in a separate programming pass, or multiple logical pages can be programmed together. For example, in a QLC physical page, the LP can be programmed on one pass, and the UP, XP and TP can be programmed on a second pass. Other programming schemes are possible. In this example, however, prior to programming the UP, XP, and TP in the second pass, the data from the LP is first read from the physical page in memory array 250 and can be stored in the page cache 240 of memory device 130. The page cache 240 is a buffer used to temporarily store data being read from or written to memory array 250 of memory device 130, and can include a cache register 242 and one or more data registers 244-246. For a read operation, the data is read from memory array 250 into one of data registers 244-246, and then into cache register 242. Memory interface 113 can then read out the data from cache register 242. For a program operation, memory interface 113 writes the data to cache register 242, which is then passed to one of data registers 244-246, and finally programmed to memory array 250. If the program operation includes multiple pages (e.g., UP, XP, and TP), each page can have a dedicated data register to hold the corresponding page data.

In some embodiments, memory access manager 114 can send a request to suspend a memory access operation (e.g., a suspend command) to memory device 130 while the memory access operation is currently being performed. The suspend command can be received by memory access component 134, which can cause memory device 130 to enter the suspended state. In the suspended state, the ongoing memory access operation being performed on memory array 250 (e.g., on wordline 252 of memory array 250) is suspended. In one embodiment, memory access component 134 stores progress information associated with the suspended memory access operation in page cache 240. For example, memory access component 134 can store data already programmed to memory array 250 in page cache 240 (e.g., in one of data registers 244-246) responsive to receiving the suspend command, where such data can be used to resume the suspended memory access operation at a later time.

Once the original memory access operation is suspended, memory access manager 114 can send a request to perform two or more other memory access operations, such as multiple read operations on the memory array 250, while memory device 130 is in the suspended state. Memory access component 134 can receive the request and initiate the read operations on memory array 250. Each of the two or more read access operations (or any other operations) can have a ready/busy signal to indicate completion of each read access operation. Upon completion of at least one of the read operations, memory access component 134 can provide a notification to the requestor indicating that one or more of the read operations are complete. For example, memory access component 134 can set a ready/busy signal to a certain level (e.g., a high voltage representing a logic "1") to indicate that the memory device 130 is ready to receive subsequent commands. The memory access component 134 indicate when can indicate when each individual read access operation is completed, or when a set of read access operations are completed.

In response, memory access manager 114 can send a request (e.g., a resume command) to resume the previously suspended memory access operation to memory device 130. Memory access component 134 can receive the request, cause the memory device 130 to exit the suspended state, and resume the original memory access operation on memory array 250 using the progress information from page cache 240. For example, memory access component 134 can read the data stored in page cache 240, which was previously written to memory array 250, and compare that data to the data in the resume command to determine where the memory access operation left off when suspended. Memory access component 134 can thus resume programming the data for the memory access operation to memory array 250 from that point.

While memory device 130 is in the suspended state and in response to receiving two or more read commands, memory access component 134 or memory access manager 114 can determine whether the two or more memory access commands overlap. A memory access command overlaps with another memory access command when at least a portion of the address range of one memory access command overlaps with the address range of the other memory access command. Non-overlapping memory access commands (e.g., read commands) can be on distinct wordlines and/or memory pages of a plane. When two or more read operations overlap, memory access component 134 can process the read operations one at a time. In particular, memory access component 134 can process the first read operation by retrieving, from memory array 250, the host data associated with the first read command, caching the host data in page cache 240, transferring the host data from page cache 240 to memory sub-system controller 115, and then processing the next read command.

When two or more read commands are non-overlapping (e.g., their address ranges do not overlap), memory access component 134 retrieve, from memory array 250, the host data associated with each of the two or more read commands (up to the space cache limit), cache the host data in page cache 240, and transfer the host data from page cache 240 to memory sub-system controller 115 in a single transfer operation.

In some embodiments, the memory access component 134 can cache data from two of more non-overlapping read commands when the memory device 130 is not in the suspended state. In particular, when the memory device is not in the suspended state and in response to receiving two or more read commands from the memory sub-system controller, memory access component 134 can determine whether the two or more read commands overlap. Responsive to determining that the read commands do not overlap, memory access component 134 can store the data associated with the read commands in page cache 240, and transfer, to memory sub-system controller 115, the data from the read commands in a single transfer operation.

Figure 3:
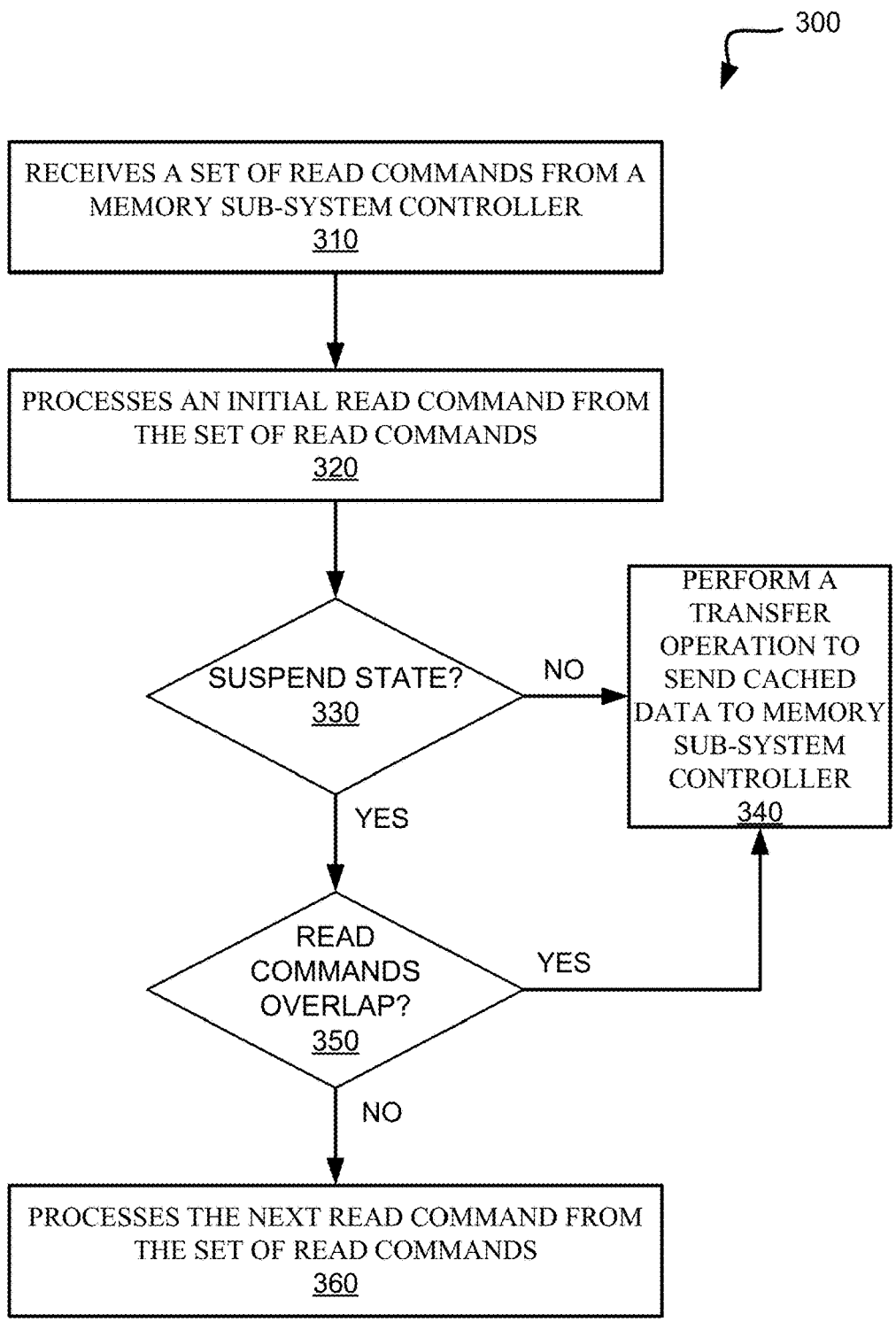
FIG. 3 is a flow diagram of an example memory device method of multiple read operation execution during program suspend protocol, in accordance with some embodiments of the present disclosure.

FIG. 3 is a flow diagram of an example memory device method of multiple read operation execution during program suspend protocol, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by memory access component 134 of FIG. 1 and FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing logic receives a sequence of read commands from a memory sub-system controller. For example, the processing logic (e.g., memory access component 134) can receive, from memory access manager 114, multiple requests to perform read operations on memory array 250 of memory device 130. In some embodiments, memory access manager 114 sends a request to perform the memory access operations to memory device 130, which is received by memory access component 134. In some embodiments, memory access manager 114 sends the request in response to a request received from some other component, such as host system 120.

In operation 320, the processing logic processes an initial read command from the sequence of read commands. For example, the processing logic can initiate the initial read command on the memory array 250. In one embodiment, memory access component 134 can apply one or more read reference voltages to the corresponding wordlines, of memory array 250, that is specified by the address range of the initial read command. The corresponding data read retrieved from the memory array 250 can be stored in a portion of cache page 240. For example, page cache 240 can include a 16 KiB memory page, whereas the initial read command can request four KiB of data. Accordingly, the memory access component 134 can store the four KiB of data retrieved by the initial read command on the first portion (e.g., first four KiB) of the 16 KiB memory page.

At operation 330, the processing logic (e.g., memory access component 134) determines whether the memory device (e.g., memory device 130) is in the suspended state. In some embodiments, the processing logic can determine that memory device 130 is in the suspended state based on the processing logic previously receiving, from memory access manager 114, a program suspend command requesting that memory device 130 enter the suspended state without a subsequent resume command. In some embodiments, the processing logic can maintain, in a data structure, an indicator (e.g., a bit flag) indicative of whether memory device 130 is in the suspended state. For example, the flag can be set to 1 responsive to the processing logic receiving a program suspend command, and set to 0 responsive to the processing logic receiving a program resume command. Responsive memory access component 134 determining that memory device 130 is not in the suspended state, the processing logic proceeds to operation 340. Responsive to determining that memory device 130 is in the suspended state, the processing logic proceeds to operation 350.

At operation 340, processing logic transfers the data, from the page cache 240, to memory sub-system controller 115. For example, the processing logic can perform a transfer operation to transfer the data. The processing logic can then process the next read command from the sequence of read commands.

At operation 350, the processing logic determines whether a next read command from the sequence of read commands overlaps with the initial read command. For example, the processing logic can determine whether the address range associated with the initial read command overlaps with the address range associated with the next read command. Responsive to determining that the read commands overlap, the processing logic proceeds to operation 340. Responsive to determining that the read commands do not overlap, the processing logic proceeds to operation 360.

At operation 360, the processing logic processes the next read command from the sequence of read commands. For example, the processing logic can initiate the next read command on the memory array 250 by applying one or more read reference voltages to the corresponding wordlines, of memory array 250, that are specified by the address range of the next read command. The corresponding data read from the memory array 250 can be stored in another portion of cache page 240. For example, the next read command can also request four KiB of data. Accordingly, the memory access component 134 can store the four KiB of data retrieved by the next read command on the second portion (e.g., second four KiB) of the 16 KiB memory page.

The processing logic can repeat operation 350 for each additional read command of the sequence of read command until the page cache 240 is full or does not have the memory space to store another read command, at which point the processing logic can transfer the data stored in page cache 240 to memory sub-system controller 115.

In some embodiments, the processing logic can receive a single read command and cache the corresponding data retrieved in the page cache. The processing logic can then, prior to transferring the cache data to memory sub-system controller 115, receive another read command. In response, the processing logic can determine whether the memory device 130 is in the suspended state, and whether the respective address ranges corresponding to each read command overlap. In response to determining that the read commands are non-overlapping, the processing logic can retrieve and cache the data corresponding to the another read command in another portion of page cache 240. The processing logic can then transfer, to memory sub-system controller 115, the data from both read commands in a single transfer operation.

Figure 4:
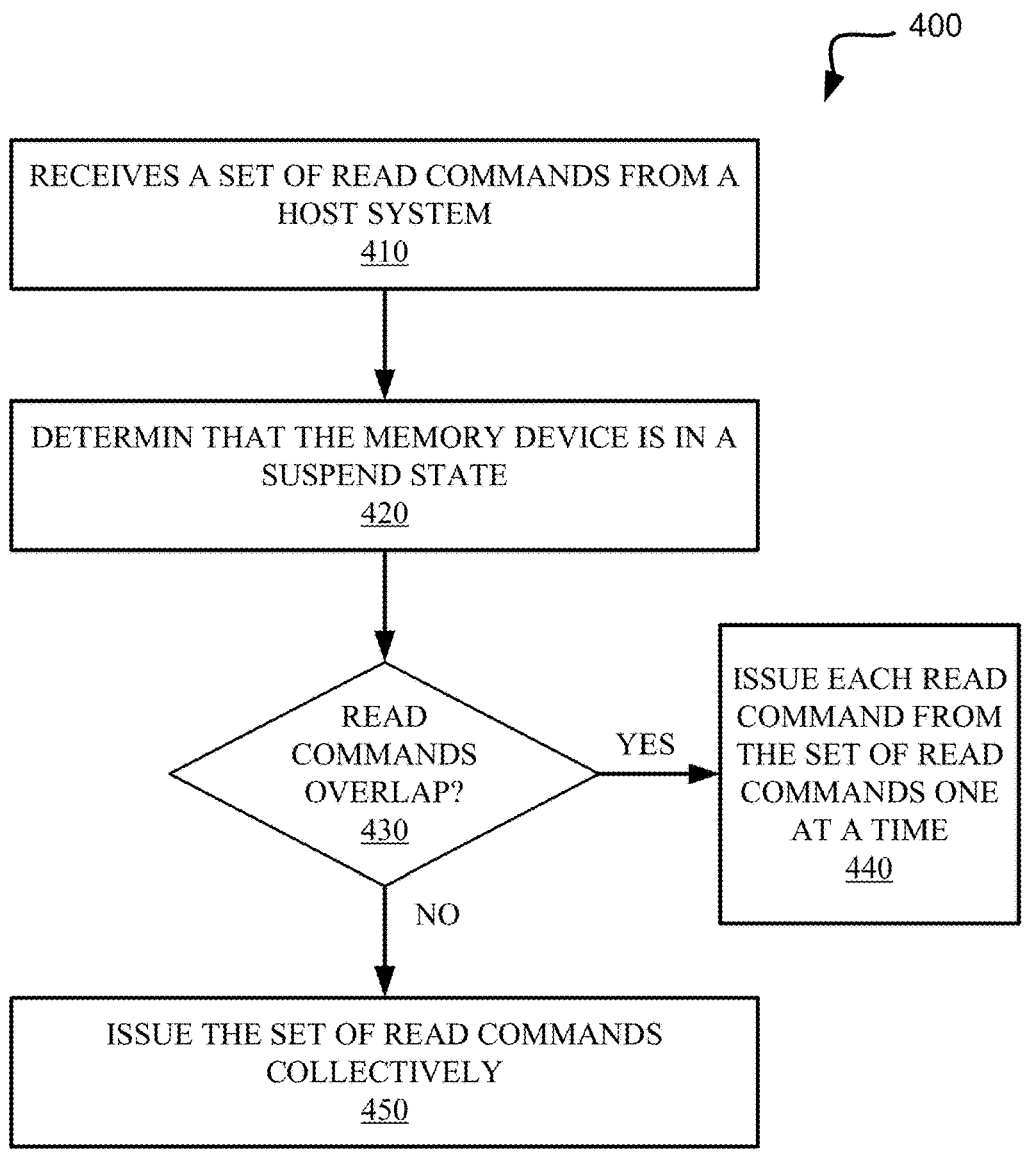
FIG. 4 is a flow diagram of a memory sub-system controller method of multiple read operation execution during program suspend protocol, in accordance with some embodiments of the present disclosure.

FIG. 4 is a flow diagram of an example controller method of multiple read operation execution during program suspend protocol in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by memory access manager 114 of FIG. 1 and FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic receives a sequence of read commands from a host system. For example, the processing logic (e.g., memory access manager 114) can receive, from host system 120, multiple requests to perform read operations on a memory array of a memory device, such as memory array 250 of memory device 130.

At operation 420, the processing logic determines that the memory device (e.g., memory device 130) is in the suspended state. In some embodiments, the processing logic (e.g., memory access manager 114) can determine that memory device 130 is in the suspended state based on the processing logic previously utilizing a program suspend protocol and issuing a program suspend command requesting that memory device 130 enter the suspended state. For example, memory access manager 114 can track whether the program suspend state command was previously issued and whether a subsequent program resume command was issued. When a program suspend command is issued without a subsequent program resume command, the processing logic can determine that the memory device 130 is in the suspended state. In some embodiments, the processing logic can maintain a flag (e.g., a bit) indicative of whether memory device 130 is in the suspended state. For example, the flag can be set to 1 responsive to the processing logic issuing a program suspend command, and set to 0 responsive to the processing logic issuing a program resume command.

At operation 430, the processing logic determines whether the read commands overlap. For example, the processing logic can determine whether the address range specified with one read command overlaps with the address range specified with another read command. Responsive to determining that the read commands overlap, the processing logic proceeds to operation 440. Responsive to determining that the read commands do not overlap, the processing logic proceeds to operation 450.

At operation 440, the processing logic issues each read command (from the sequence of read commands) to the memory device one at a time. For example, the memory access component 134 can issue, to memory device 130, the first read command from the sequence of read commands, receive host data corresponding to the address range of the first read command, then issue another read command from the sequence of read commands, and so forth until each read command from the sequence is processed. For each read command, the memory device 130 can retrieve, from memory array 250, the host data associated with the read command, cache the host data in page cache 240, and transferring the host data from page cache 240 to memory access component 134.

At operation 450, the processing logic issues each read command (from the sequence of read commands) to the memory device collectively. For example, the memory access component 134 can issue, to memory device 130, each read command from the sequence of read commands without requiring the data to be clocked out (transferred) from memory device 130. For each received read command, memory device 130 (via memory access component 134).

For each read command, the memory device 130 can retrieve, from memory array 250, the data associated with the read command, cache the data in page cache 240, and transfer the data from page cache 240 to memory access component 134 in a single transfer operation.

Figure 5:
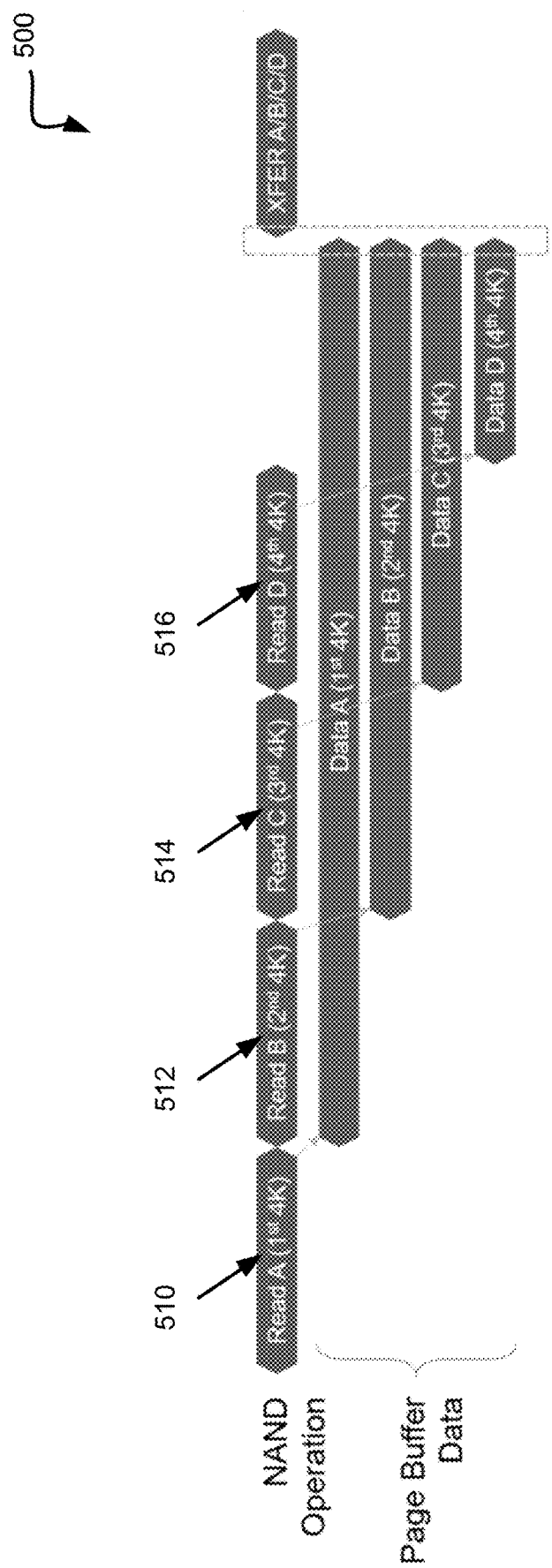
FIG. 5 is an illustration of a page cache receiving data from multiple read operations, in accordance with some embodiments of the present disclosure.

FIG. 5 is an illustration of a page cache 500 receiving data from multiple read operations, in accordance with some embodiments of the disclosure. In some embodiments, page cache 500 can be similar or the same as page cache 240. Page cache 500 can include a memory page capable of caching 16 KiB of data. As illustrated, memory access component 134 can execute read operation A 510 to retrieve four KiB of data from a memory array (e.g., memory array 250) and store the four KiB of data at the first four KiB portion of page cache 500. Read operation B 512 can be a read command requesting four KiB of data from memory array 250. Responsive to the memory sub-system controller 115 (via memory access manager 114) or memory device 130 (via memory access component 134) determining that the memory range associated with read operation B 512 does not overlap with the memory range associated with read operation A 510, the memory access component 134 can execute read operation B to retrieve four KiB of data from memory array 250 and store the four KiB of data at the second four KiB portion of page cache 500.

Read operation C 514 can be a read command also requesting four KiB of data from memory array 250. Responsive to the memory sub-system controller 115 (via memory access manager 114) or memory device 130 (via memory access component 134) determining that the memory range associated with read operation C 514 does not overlap with the memory range associated with read operation A 510 or with read operation B 512, the memory access component 134 can execute read operation C to retrieve four KiB of data from memory array 250 and store the four KiB of data at the third four KiB portion of page cache 500. Read operation D 516 can be a read command also requesting four KiB of data from memory array 250. Responsive to the memory sub-system controller 115 (via memory access manager 114) or memory device 130 (via memory access component 134) determining that the memory range associated with read operation D 516 does not overlap with the memory range associated with read operation A 510, with read operation B 512, or with read operation C 514, the memory access component 134 can execute read operation D to retrieve four KiB of data from memory array 250 and store the four KiB of data at the last four KiB portion of page cache 500. Memory access component 134 can then transfer the 16 KiB of data from page cache 240 to sub-system controller 115.

It should be noted that read commands and page cache portion size can vary. For example, a 16 KiB page cache can store four non-overlapping 4-KiB reads, two non-overlapping 8-KiB reads, two non-overlapping 4-KiB reads and one non-overlapping 8-KiB read, etc. Similarly, a 32-KiB or 64-KiB memory page can store any combination of different sized, non-overlapping reads.

Figure 6:
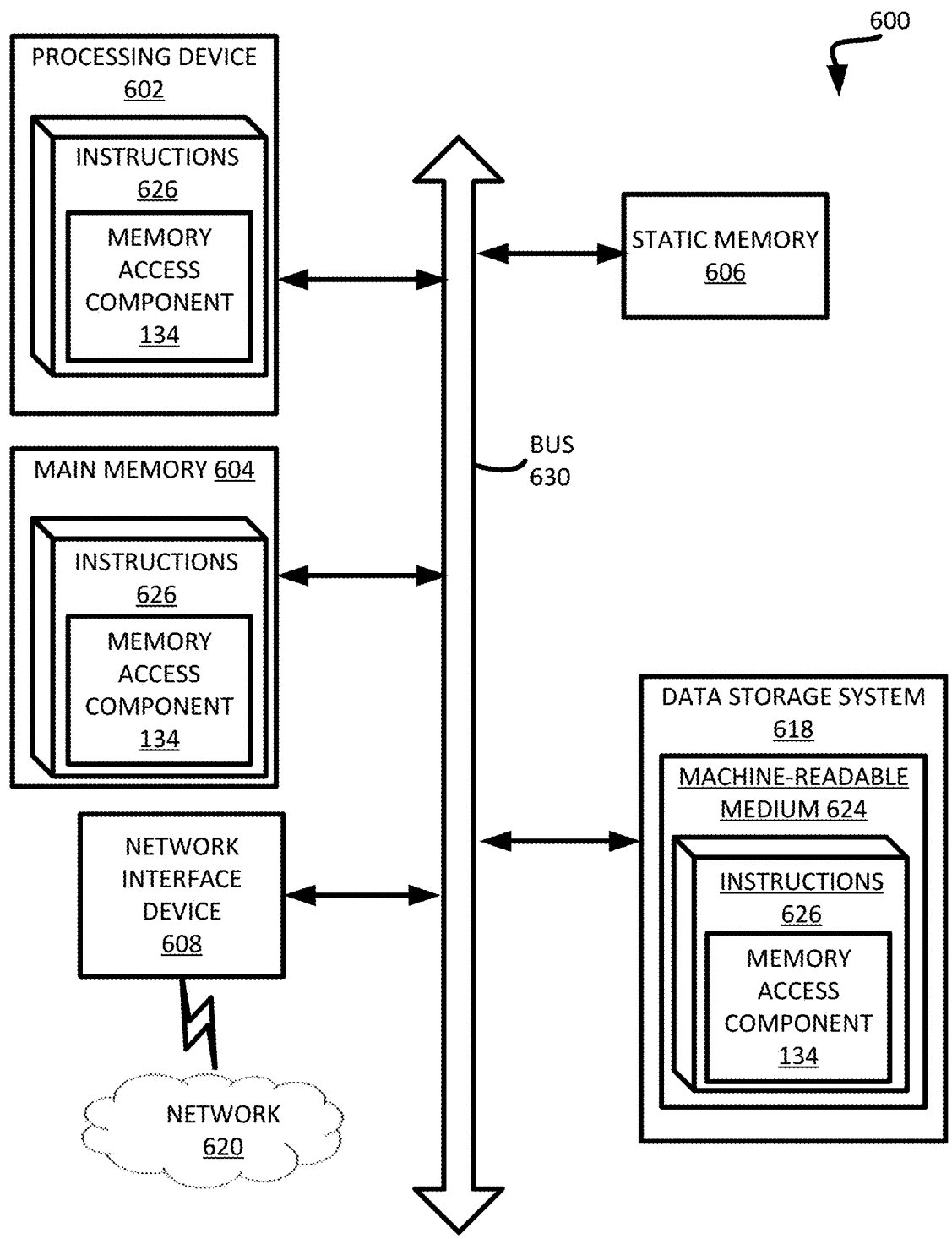
FIG. 6 is a block diagram of an example computer system in which embodiments of the present disclosure can operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes or utilizes a memory sub-system (e.g., the memory sub-system 110 of FIG. 1) or can be used to perform the operations of a controller (e.g., to execute an operating system to perform operations corresponding to memory access component 134 and/or memory access manager 114 (not shown) of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630. Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to memory access component 134 and/or memory access manager 114 (not shown) of FIG. 1. While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device; and
a processing device, operatively coupled with the memory device, to perform operations comprising:
   receiving a sequence of read commands from a memory sub-system controller;
   retrieving first data by executing a first read command of the sequence of read commands;
   storing the first data in a first portion of a register of a cache of the memory device;
   responsive to determining that the memory device is in a suspended state, determining whether a first address range specified by the first read command overlaps with a second address range specified by a second read command of the sequence of read commands;
   responsive to determining that the first address range does not overlap with the second address range, retrieving second data by executing the second read command and storing the second data in a second portion of the register of the cache such that the first data and the second data are concurrently stored in the register; and
   transferring the first data and the second data to the memory sub-system controller.

2. The system of claim 1, wherein the processing device determines that the memory device is in the suspended state based on the memory device receiving a program suspend command.

3. The system of claim 1, wherein the processing device maintains, in a data structure, a bit flag indicative of whether memory device is in the suspend state.

4. The system of claim 1, wherein the processing device is to perform further operations comprising:
   responsive to determining that the first address range overlaps with the second address range, transferring the first data to the memory sub-system controller.

5. The system of claim 1, wherein the cache comprises a page cache used to temporarily store data being read from or written to a memory array of the memory device.

6. The system of claim 1, wherein transferring the first data and the second data is executed in response to receiving a subsequent read command requesting data larger than a remaining unused portion of the cache.

7. The system of claim 1, wherein transferring the first data and the second data is executed in response to the cache having no remaining unused portion.

8. A method comprising:
receiving, by a local media controller of a memory device, a first read command from a memory sub-system controller;
retrieving first data by executing a first read command;
storing the first data in a first portion of a register of a cache of the memory device in a first portion of a cache of the memory device;
responsive to receiving a second read command from the memory sub-system controller, determining that the memory device is in a suspended state;
responsive to determining that a first address range specified by the first read command does not overlap with a second address range specified by the second read command, retrieving second data by executing the second read command and storing the second data in a second portion of the register of the cache such that the first data and the second data are concurrently stored in the register; and
transferring the first data and the second data to the memory sub-system controller.

9. The method of claim 8, wherein determining that the memory device is in the suspended state is based on the memory device receiving a program suspend command.

10. The method of claim 8, further comprising: maintaining, in a data structure, a bit flag indicative of whether memory device is in the suspend state.

11. The method of claim 8, further comprising:
responsive to determining that the first address range overlaps with the second address range, transferring the first data to the memory sub-system controller.

12. The method of claim 8, wherein the cache comprises a page cache used to temporarily store data being read from or written to a memory array of the memory device.

13. The method of claim 8, wherein transferring the first data and the second data is executed in response to receiving a subsequent read command requesting data larger than a remaining unused portion of the cache.

14. The method of claim 8, wherein transferring the first data and the second data is executed in response to the cache having no remaining unused portion.

15. A non-transitory computer-readable storage medium comprising instructions that, when executed by a processing device operatively coupled to a memory device, performs operations comprising:
receiving a sequence of read commands from a memory sub-system controller;
retrieving first data by executing a first read command of the sequence of read commands;
storing the first data in a first portion of a register of a cache of the memory device;
responsive to determining that the memory device is in a suspended state, determining whether a first address range specified by the first read command overlaps with a second address range specified by a second read command of the sequence of read commands;
responsive to determining that the first address range does not overlap with the second address range, retrieving second data by executing the second read command and storing the second data in a second portion of the register of the cache such that the first data and the second data are concurrently stored in the register; and
transferring the first data and the second data to the memory sub-system controller.

16. The non-transitory computer-readable storage medium of claim 15, wherein the processing device determines that the memory device is in the suspended state based on the memory device receiving a program suspend command.

17. The non-transitory computer-readable storage medium of claim 15, wherein the processing device maintains, in a data structure, a bit flag indicative of whether memory device is in the suspend state.

18. The non-transitory computer-readable storage medium of claim 15, wherein the processing device is to perform further operations comprising:
responsive to determining that the first address range overlaps with the second address range, transferring the first data to the memory sub-system controller.

19. The non-transitory computer-readable storage medium of claim 15, wherein transferring the first data and the second data is executed in response to at least one of receiving a subsequent read command requesting data larger than a remaining unused portion of the cache or to the cache having no remaining unused portion.

20. The non-transitory computer-readable storage medium of claim 15, wherein the processing device is to perform further operations comprising:
responsive to determining that the memory device is not in the suspended state, determining that the first address range does not overlap with the second address range; and
retrieving second data by executing the second read command and storing the second data in a second portion of the cache.

* * * * *